United States Patent [19]
Yamaguchi et al.

[11] 3,919,178
[45] Nov. 11, 1975

[54] METHOD OF MANUFACTURING POLYMER GRAFT-POLYMERIZED ONTO WATER SOLUBLE INORGANIC SUBSTANCE

[75] Inventors: Tadashi Yamaguchi, Sendai; Hiroshi Hoshi, Narashino; Michio Hirakawa; Isao Watanabe, both of Ichikawa, all of Japan

[73] Assignee: Lion Fat & Oil Co., Ltd., Tokyo, Japan

[22] Filed: Feb. 22, 1973

[21] Appl. No.: 334,664

[30] Foreign Application Priority Data
Feb. 24, 1972 Japan............................ 47-19528

[52] U.S. Cl......... 260/79.3 R; 260/80 M; 260/80 P; 260/80 C; 260/89.5 A; 260/89.5 AW; 260/89.5 S
[51] Int. Cl.² ............... C08F 28/00; C08G 75/00; C08F 120/02
[58] Field of Search............ 260/80 M, 80 C, 80 P, 260/89.5 A, 89.5 AW, 89.5 S, 79.3 R

[56] References Cited
UNITED STATES PATENTS
1,859,845  5/1932  Rue et al........................... 423/512
2,097,263  10/1937  Strain............................ 260/89.5 A OTHER PUBLICATIONS
Chem. Abs., "Alkali Sulfite", Vol. 35, 6071, Paragraph 3, J. G. Melendy.

Primary Examiner—Joseph L. Schofer
Assistant Examiner—Herbert J. Lilling
Attorney, Agent, or Firm—Woodhams, Blanchard and Flynn

[57] ABSTRACT

A method of manufacturing a water-soluble or water-insoluble polymer graft-polymerized onto a water-soluble inorganic salt, which comprises effecting the graft-polymerization in solvents incapable of the dissolving the water-soluble inorganic salt or in a saturated solution of the inorganic salt by reacting the water soluble inorganic salt constituting the nucleus of the graft polymer with a compound capable of supplying the same anion as that of said inorganic salt or an anion capable of effecting double decomposition of said inorganic salt, in the presence of monomers capable of undergoing radical polymerization or radical copolymerization or a solution or dispersion thereof.

8 Claims, No Drawings

METHOD OF MANUFACTURING POLYMER GRAFT-POLYMERIZED ONTO WATER SOLUBLE INORGANIC SUBSTANCE

BACKGROUND OF THE INVENTION

1. Field of the Invention:

The present invention relates to a method of effecting graft polymerization of a monomer onto a water-soluble inorganic salt.

The water-soluble polymer of water-insoluble polymer obtained by the method of the present invention is a polymer in the state of so-called graft-polymerization onto a water-soluble inorganic salt. As to the state of so-called graft-polymerization referred to herein, it is yet to be clarified if it is an exact graft-polymerization in the strict sense of the term, as one may be convinced of in the light of the showings in the examples to be given later on, but it is clear that the relation between the inorganic substance, which is in a crystalline, and the polymer is obviously not a mere adsorption or adhesion, and therefore, we call it 'graft-polymerization' hereunder for convenience' sake.

2. Description of the Prior Art:

It has been reported that organic polymers may be bonded to inorganic compounds (cf. V. A. Kargin et al. Vysckomol, Soedin 1, 330–331, 1713–20 (1959)), (A. Blumstein, J. P. S. A3 2653 ('65). J. A. Bittles et al J. P. S. A2 1221 ('64)). However, heretofore, no effective product or commercially acceptable processes have been suggested.

We have already proposed a method of manufacturing a polymer graft-polymerized onto an inorganic substance in U.S. Ser. No. 277,343, now Pat. No. 3,857,816. The present invention is a method using water-soluble inorganic substance in said proposed method.

SUMMARY OF THE INVENTION

The principal object of the present invention is to provide a method of manufacturing a water-soluble or water-insoluble polymer graft-polymerized onto a water-soluble inorganic salt which comprises the steps of reacting the water-soluble inorganic salts constituting the nucleus of the water-soluble or water-insoluble graft polymer with a compound capable of supplying the same anion as that of said inorganic salt or a compound capable of supplying an anion capable of effecting double decomposition of the inorganic salt, in the presence of either (1) at least one kind of radical-polymerizing or radical copolymerizing monomer, which is capable of being polymerized into a water-soluble or water-insoluble polymer, or its solution or dispersion or emulsion, or (2) at least one kind of radical polymerizing or radical copolymerizing monomer, which is capable of being polymerized into a water-insoluble polymer but is capable of being polymerized into a water-soluble polymer by water-solubilizing treatment, or its suspension or dispersion incapable of dissolving the water-soluble inorganic salt, and subjecting the resulting graft polymer to water-solubilizing treatment in the case of the above (2).

The present invention, in short, relates to a method which comprises the process of converting at least a part of the water-soluble inorganic salt into a new crystal or dissolving only a part of the water-soluble inorganic salt by the reaction mentioned above, utilizing active points present on the surface of the newly resulting crystalline substance, which has been produced by the conversion or dissolution, in the initiation of polymerization of the monomer to thereby effect graft polymerization of the monomer onto the surface of the crystalline substance.

The water-soluble polymers prepared according to the present invention are useful as a pack for pack detergents or as a packing material or a container which can be disposed of by dissolving in water. The water-insoluble polymers can be also utilized as construction materials or other materials for vessels. According to the present invention, even water-soluble inorganic salts such as Glauber's salt and the like which have never been utilized for these latter uses owing to their water solubility are now converted to be water-insoluble and thus available for such uses.

In the present invention, monomers having radical polymerizability and radical copolymerizability are applicable. To give examples of such monomers capable of being polymerized into water-soluble polymers there can be enumerated sodium or potassium acrylate, acrylic acid, and methacrylic acid. Examples of monomers capable of being polymerized and then converted to water-soluble polymers by water-solubilizing treatment, are methacrylic esters, acrylic esters, vinyl acetate, calcium acrylate, or magnesium acrylate, etc. Examples of monomers capable of being polymerized into water-insoluble polymers as they are, are styrene, 1-pentene, vinyl stearate, m-chlorostyrene, vinyl acetate, chloroprene, vinyl laurate, vinylidene chloride, methyl methacrylate, pentachlorostyrene, methyl acrylate, etc.

It is to be noted that the water-soluble inorganic salt and the compound to act thereon for use in the present invention cannot be specified by concrete chemical designation. A matter of consequence in the method of the present invention in the above-mentioned monomers is to choose an appropriate combination of the water-soluble inorganic salt capable of forming a crystalline substance having active sites and the compound to act thereon, because the crystals having active sites must be produced in a solution or dispersion containing the monomer. Hereunder will be given examples of compounds capable of producing a crystalline substance having active points in the medium containing the monomers mentioned above.

1. The process of producing active sites onto the surface of crystals of sodium bicarbonate by introducing $SO_2$ gas into a suspension of crystals of sodium bicarbonate to thereby produce sodium bisulfite.

2. The process of producing active sites onto the surface of crystals of sodium carbonate by introducing $SO_2$ gas into a suspension of crystals of sodium carbonate to thereby produce sodium sulfite.

3. The process of producing active sites onto the surface of crystals of sodium sulfite by introducing $SO_2$ gas into a suspension of crystals of sodium sulfite to thereby produce sodium bisulfite.

It will be easily understood by anyone skilled in the art that the water-soluble crystalline substance which can be used in the present invention is not limited to those described therein, but other water-soluble crystalline substances can be used.

Further, in practicing the method of the present invention, the respective quantity of the monomer, crystalline inorganic salt and anion-supplying compound can be optionally determined in accordance with known chemical common knowledge by taking into consideration the intended use of the polymer of the present invention as well as the operational conditions. In the method of the present invention, the monomer is used as it is or after making it into a solution or a dispersion by employing conventional solvents for use in solution-polymerization, such as benzene, alcohols, ketones, alkyl halides, ethers and the like, and in this solution or dispersion, the crystalline substance is formed to polymerize the monomer, and the concentration of the monomer in said solution or dispersion is appropriately chosen in consideration of the kind of the monomer and the means of producing the crystalline substance having active sites.

The ratio of the organic portion to the total weight of the polymer obtained by the method of the present invention can be easily modified at will by regulating the quantity of the starting material to be employed, and therefore, in the case of the water-insoluble polymer, the solubility of the graft polymer can be controlled at will by regulating the above weight ratio.

A polymer under the present invention wherein the weight ratio of the polymerized portion to the total weight of the polymer is relatively high, such as more than about 10 wt% - particularly, more than 50 wt%, can be used as the material to be molded as it is. Hereunder will be given concrete examples embodying the present invention.

DESCRIPTION OF THE PREFERRED EMBODIMENTS

EXAMPLE 1.

After suspending 200 g of sodium carbonate (having no water of crystallization) having a grain size of less than 100 mesh in 800 ml of 98% methanol at 55°C under atmospheric pressure, 50 g of methyl methacrylate was added to the suspension. Next, 2.5 g of sulfurous acid gas was blown into this suspension with stirring over a one hour period at said temperature. After completion of the reaction for 9 hours, 227 g of the solid matter was obtained by filtering the suspension and then drying the residue. A 10.00 g portion of this solid matter was subjected to extraction with benzene for 24 hours by means of a Soxhlet extractor, 0.59 g of polymethyl methacrylate being obtained. The benzene extraction residue (A) was subjected to extraction with water for 24 hours to obtain 1.96 g of extraction residue (B). When a portion of the resulting solid matter was analyzed by means of infrared absorption spectrum, and elemental analysis, the result showed that the water extraction residue (B) was composed of 0.83 g of sodium carbonate and 1.13 g of polymethyl methacrylate. The water extraction residue (B) was subjected to extraction with benzene, and 1.01 g of the benzene soluble portion (C) was obtained. The infrared absorption spectrum of this benzene soluble portion agreed with that of the polymethyl methacrylate. The yield of polymethyl methacrylate of the solid matter was 17.2%.

From the foregoing result, it was found that the solid matter consisted of a water-soluble inorganic substance (sodium carbonate and sodium sulfite) with a water-insoluble high molecular substance grafted thereto.

By subjecting 10 g of the solid matter to dipping in 100 ml of water, only a small quantity of sodium ions was educed. Accordingly, the solid matter was made non-educible as the water-soluble inorganic substance was coated with the high molecular substance. This solid matter can be easily molded under a pressure and in the range of from 150°C to 300°C, and the bending strength is 150 – 350 kg/cm². As the molding (plate) to be obtained by the method of the present invention is insoluble in water, it can be used in the same condition as those of substantially water-insoluble moldings. In order that the molding to be obtained by the method of the present invention is insoluble in water, it was necessary that the content of polymethylmethacrylate must be 18 – 70 volume%.

EXAMPLE 2.

After suspending 400 g of sodium sulfite (having no water of crystallization) having and the grain size of less than 100 mesh and 1.0 g of water in 1500 g of petroleum ether under atmospheric pressure in an autoclave at 55°C, 200 g of acrylic acid was added to the suspension. Next, 25.0 g of sulfurous acid gas was blown into the suspension with stirring over one hour at said temperature. Then, after further stirring for 9 hours, the suspension was filtered and the residue was dried to obtain 451 g of solid matter.

When a 10 g portion of this solid matter was subjected to extraction with methanol for 24 hours by means of a Soxhlet extractor, 0.79 g of polyacrylic acid was educed. It was confirmed from the infrared absorption spectrum of the extracted residue that the extracted residue consists mainly of sodium sulfite and polyacrylic acid. It was found from elementary analysis that the polyacrylic acid in the extracted residue was 0.39 g. When the extracted residue was immersed in the water for 24 hours, it was completely dissolved. The result showed that the solid matter consists of the water-soluble inorganic substance with a water-soluble high molecular substance grafted thereto. Methanol was added to this solid matter and the mixture was placed into a mold and then the methanol was caused to evaporate, and when it was dried, a molded product was obtained. Since this molded product was a composition of water-soluble substances, it can be easily discarded into water after the use of the molded body.

EXAMPLE 3.

After suspending 400 g of sodium sulfite (having no water of crystallization) and having a grain size of less than 100 mesh and 1.0 g of water in 1500 g of petroleum ether in an autoclave at 55°C under atmospheric pressure, 200 g of vinyl acetate monomer was added to the suspension. Next, 25.6 g sulfurous acid gas was blown into the suspension with stirring over one hour. Then, after further stirring for 9 hours, the suspension was filtered and the residue was dried, whereby 487 g of solid matter was obtained. When a 10.00 g portion of the solid matter was subjected to extraction with methanol for 24 hours by means of Soxhlet extractor, 1.24 g of polyvinyl acetate was educed. When the remaining extracted residue was subjected to extraction with water for 24 hours by means of Soxhlet extractor, 0.59 g of water-insoluble residue was obtained. The water-insoluble residue was soluble in methanol, and the infrared absorption spectrum agreed with the absorption of the polyvinyl acetate. These showings verify that the solid matter consists of mainly crystals of sodium sulfite with polyvinyl acetate grafted thereto.

A 100 g portion of the solid matter was admixed with 100 g of methanol and 5 g of caustic soda, and the mixture was stirred for 4 hours, and thereafter a large excess petroleum ether was added to the mixture and filtered and dried, and 93 g of the resulting solid matter was obtained. This solid matter consists mainly of sodium sulfite and partly unsaponified polyvinyl alcohol. Water was added to the solid matter so as to be wetted, and was molded under a pressure to produce a molded product plate or sheet, and then the product was subjected to hot blast and dried, whereby the molded plate was obtained. When this plate was immersed in water for 2 days, it was completely dissolved.

What is claimed is:

1. A method of preparing a polymer graft-polymerized onto a water-soluble inorganic salt, which comprises the steps of: mixing
    a. particles of a water-soluble inorganic salt selected from the group consisting of sodium bicarbonate, sodium carbonate and sodium sulfite, said particles being suspended in an organic liquid which is a non-solvent for said salt and which is a solvent for solution polymerization of the below-mentioned monomer,
    b. at least one monomer capable of radical polymerization,
  to form a reaction mixture of (a) and (b),
    feeding sulfur dioxide gas into said reaction mixture and reacting said sulfur dioxide with said particles of said salt to transform portions of said salt into a different water-soluble inorganic salt as a reaction product, and simultaneously forming active radical sites on said particles;
    maintaining said mixture under polymerizing conditions effective to polymerize said monomer onto said active sites to form solid particles of a polymer of said monomer grafted onto nuclei of said particles;
    and then recovering the polymerization product particles from the reaction system.

2. A method according to claim 1, wherein said monomer is selected from the group consisting of sodium and potassium acrylates, acrylic acid, and methacrylic acid the polymer thereby produced being water-soluble.

3. A method according to claim 1, wherein said monomer is selected from the group consisting of methacrylic ester, acrylic ester, vinyl acetate, calcium and magnesium acrylates, styrene, 1-pentene, vinyl stearate, m-chlorostyrene, chloroprene, vinyl laurate, vinyl chloride, vinylidene chloride and pentachlorostyrene, the polymer thereby produced being water-insoluble 4. A method according to claim 3 wherein the monomer is selected from the group consisting of methacrylic ester, acrylic ester, vinyl acetate and calcium and magnesium acrylates, and then the water-insoluble polymer is subjected to a water-solubilizing treatment to transform same to a water-soluble polymer 5. A water-soluble polymer graft-polymerized onto a water-soluble inorganic salt, obtained by the method of claim 2.

6. A water-insoluble polymer graft-polymerized onto a water-soluble inorganic salt, obtained by the method of claim 3.

7. A water-soluble polymer graft-polymerized onto a water-soluble inorganic salt, obtained by the method of claim 4.

8. A method according to claim 1 in which said salt is sodium carbonate and said monomer is methyl methacrylate.

* * * * *

UNITED STATES PATENT OFFICE
CERTIFICATE OF CORRECTION

Patent No. 3,919,178          Dated November 11, 1975

Inventor(s) Tadashi Yamaguchi, Hiroshi Hoshi, Michio Hirakawa and Isao Watanabe

It is certified that error appears in the above-identified patent and that said Letters Patent are hereby corrected as shown below:

On the Title page of the patent add to the Foreign Application Priority Data the following:

Feb 24, 1972     Japan..........47-19529

Signed and Sealed this twenty-third Day of March 1976

[SEAL]

Attest:

RUTH C. MASON
*Attesting Officer*

C. MARSHALL DANN
*Commissioner of Patents and Trademarks*